United States Patent
Kamatani

(10) Patent No.: US 7,479,765 B2
(45) Date of Patent: Jan. 20, 2009

(54) INTEGRATED CIRCUIT FOR CONTROLLING CHARGING, CHARGING DEVICE USING THE INTEGRATED CIRCUIT, AND METHOD FOR DETECTING CONNECTION OF SECONDARY BATTERY

(75) Inventor: Tomohiko Kamatani, Kawanishi (JP)

(73) Assignee: Ricoh Company, Ltd. (JP)

( * ) Notice: Subject to any disclaimer, the term of this patent is extended or adjusted under 35 U.S.C. 154(b) by 0 days.

(21) Appl. No.: 11/701,434

(22) Filed: Feb. 2, 2007

(65) Prior Publication Data
US 2007/0216356 A1   Sep. 20, 2007

(30) Foreign Application Priority Data
Feb. 28, 2006   (JP)   ............... 2006-052699

(51) Int. Cl.
    H02J 7/06   (2006.01)
(52) U.S. Cl. .................. 320/164; 320/128; 320/162
(58) Field of Classification Search ................ 320/133, 320/134, 155, 157, 162, 164, 116, 128
See application file for complete search history.

(56) References Cited

U.S. PATENT DOCUMENTS

| | | | | |
|---|---|---|---|---|
| 4,258,310 A * | 3/1981 | Asakawa et al. | ............ | 323/281 |
| 4,577,144 A * | 3/1986 | Hodgman et al. | ........... | 320/106 |
| 5,316,868 A * | 5/1994 | Dougherty et al. | ............ | 429/9 |
| 5,432,429 A * | 7/1995 | Armstrong et al. | .......... | 320/136 |
| 5,440,220 A * | 8/1995 | Sato et al. | .................. | 320/134 |
| 5,473,262 A * | 12/1995 | Yoshimatsu | ................ | 324/771 |
| 5,547,775 A * | 8/1996 | Eguchi et al. | ............... | 320/118 |
| 5,661,645 A * | 8/1997 | Hochstein | .................... | 363/89 |
| 5,896,025 A * | 4/1999 | Yamaguchi et al. | ......... | 320/134 |
| 5,929,603 A * | 7/1999 | Nakao et al. | ................. | 320/136 |
| 5,939,859 A * | 8/1999 | Morita | ........................ | 320/112 |
| 5,990,665 A * | 11/1999 | Kawata et al. | .............. | 320/162 |
| 6,060,864 A * | 5/2000 | Ito et al. | ...................... | 320/136 |
| 6,181,107 B1 * | 1/2001 | Hirose | ......................... | 320/134 |
| 6,370,046 B1 * | 4/2002 | Nebrigic et al. | ............... | 363/60 |
| 6,373,790 B1 * | 4/2002 | Fujisawa | ..................... | 368/204 |
| 6,489,749 B1 * | 12/2002 | Nakashimo et al. | ......... | 320/134 |
| 6,859,015 B1 * | 2/2005 | Fazakas | ...................... | 320/150 |

(Continued)

FOREIGN PATENT DOCUMENTS

JP   01-186126   7/1989

(Continued)

Primary Examiner—Akm E Ullah
Assistant Examiner—M'Baye Diao
(74) Attorney, Agent, or Firm—Dickstein Shapiro LLP

(57) ABSTRACT

An integrated circuit for charging a secondary battery including a charge current detection circuit detecting a charge current output from a charging transistor, and generating a signal including the charge current information; a voltage comparison circuit comparing a voltage of the battery with one or more predetermined voltages, and generating a signal including the voltage comparison information; and a charge controlling circuit controlling the charging transistor according to information on the voltage of the battery and the signals output from the charge current detection circuit and the voltage comparison circuit such that the charging transistor performs constant current charging or constant voltage charging, wherein the charge controlling circuit stops applying a charge current for a predetermined time in the beginning of charging, and judges that the battery is abnormally connected when the voltage of the battery becomes less than a predetermined voltage within the predetermined time.

11 Claims, 5 Drawing Sheets

U.S. PATENT DOCUMENTS

| | | | |
|---|---|---|---|
| 2002/0079869 A1* | 6/2002 | Fujiwara | 320/157 |
| 2002/0145406 A1* | 10/2002 | Onishi et al. | 320/134 |
| 2003/0141848 A1* | 7/2003 | Fujiwara | 320/134 |
| 2004/0105285 A1* | 6/2004 | Tanaka et al. | 363/73 |
| 2004/0263130 A1* | 12/2004 | Matsunaga et al. | 322/17 |
| 2005/0242780 A1* | 11/2005 | Sakuma et al. | 320/134 |
| 2006/0076928 A1* | 4/2006 | Okamoto et al. | 320/128 |
| 2006/0152200 A1* | 7/2006 | Kanai et al. | 323/222 |

FOREIGN PATENT DOCUMENTS

| | | |
|---|---|---|
| JP | 08-168188 | 6/1996 |
| JP | 10-225001 | 8/1998 |
| JP | 10-285812 | 10/1998 |
| JP | 2005-253128 | 9/2005 |

* cited by examiner

INTEGRATED CIRCUIT FOR CONTROLLING CHARGING, CHARGING DEVICE USING THE INTEGRATED CIRCUIT, AND METHOD FOR DETECTING CONNECTION OF SECONDARY BATTERY

BACKGROUND OF THE INVENTION

1. Field of the Invention

The present invention relates to an integrated circuit for controlling charging of a secondary battery, and more particularly to an integrated circuit for determining whether a secondary battery is set in a charging device on the basis of the charging state of the secondary battery. In addition, the present invention also relates to a charging device using the integrated circuit, and a method for determining whether a secondary battery is set in a charging device.

2. Discussion of the Background

Until now, the following methods have been used for determining whether a secondary battery is set in a charging device.

(1) methods using a switch which achieves an ON state when a secondary battery is set in a charging device while achieving an OFF state when no secondary battery is set (disclosed in, for example, published unexamined Japanese patent application No. (hereinafter referred to as JP-A) 10-7285812); and (2) methods in which a current is applied to a temperature detection thermistor, which is included in a battery pack, to check the voltage of the terminal of the thermistor, resulting in determination whether or not a battery is present (disclosed in, for example, Japanese patent No. (hereinafter referred to as JP) 2927354 (i.e., JP-A 01-186126).

The first-mentioned methods have a drawback in that a switch has to be provided, thereby increasing the size and costs of the device. The second-mentioned methods have drawbacks in that the methods cannot be used for batteries having no thermistor; and it is necessary to connect a terminal with the thermistor, thereby increasing the size and costs of the device. In addition, although the first-mentioned and second-mentioned methods can determine whether a battery is set in a charging device but cannot determine whether a battery is electrically connected with a terminal of the charging device.

In addition, the following methods, which do not use a switch or a thermistor, have been proposed (for example, JP 3203538 (i.e., JP-A 08-168188):

(3) methods in which a charge current is applied to a battery when a voltage not less than a predetermined voltage is detected between terminals of a charging device connected with the battery, wherein when the charge current is greater than a predetermined threshold current in a full charge state, it is judged that the battery is connected, and when the charge current is less than the threshold current, it is judged that the battery is fully charged. In addition, two additional threshold currents are set near the above-mentioned threshold current. When the time needed for changing the current from one of the additional threshold currents to the other is not less than a predetermined time, it is judged that the battery is fully charged. Further, when the time is less than the predetermined time, it is judged that the battery is detached from the charging device.

Further, the following methods, which do not use a switch or a thermistor, have been proposed (for example, JP-A 10-225001):

(4) methods which perform intermittent charging while measuring the voltage between terminals connected with a battery and the charge current in a charging process, wherein whether or not a battery is connected is determined on the basis of the results.

However, the third-mentioned methods have a drawback in that an over-discharge battery cannot be charged. Specifically, when charging is performed on an over-discharge battery while applying a large current thereto, a serious accident such as heat generation of heat or fire may occur, and therefore it is necessary to charge the battery while applying a small current until the battery has a predetermined voltage. Therefore, the threshold voltage which is used for judging whether or not a battery is present has to be set so as to be greater than the voltage of an over-discharge battery. In addition, the method in which two additional threshold currents are set near the above-mentioned threshold current (i.e., full-charge current) to determine whether a battery is connected and the battery is fully charged has a drawback in that the scale of the circuit increases.

It is necessary for the fourth-mentioned methods to perform intermittent charging in addition to general constant current-constant voltage charging, and therefore an intermittent charging device has to be provided. Accordingly, the methods have a drawback in that the size and costs of the charging device increase.

Because of these reasons, a need exists for an integrated circuit (and a charging device), which can determine whether a secondary battery is correctly connected with a charging device while having a small size and low costs.

SUMMARY OF THE INVENTION

As one aspect of the present invention, an integrated circuit for charging a secondary battery via a charging transistor is provided which includes a charge current detection circuit which detects a charge current output from the charging transistor, and generates and outputs a signal including the charge current information; a voltage comparison circuit which compares the voltage of the secondary battery with one or more predetermined voltages, and generates and outputs a signal including the voltage comparison information; and a charge controlling circuit which controls the charging transistor according to information on the voltage of the secondary battery and the signals output from the charge current detection circuit and the voltage comparison circuit such that the charging transistor performs constant current charging in which a predetermined current is output or constant voltage charging in which a charge current is output so that the secondary battery has a predetermined voltage. The charge controlling circuit stops applying a charge current for a predetermined time T1 in the beginning of charging of the secondary battery. When the voltage comparison circuit detects that the voltage of the secondary battery becomes less than a predetermined voltage V1 within the predetermined time T1, the charge controlling circuit judges that the secondary battery is abnormally connected and performs an abnormality correction treatment (such as stopping of application of charge current).

Alternatively, in the integrated circuit, when the voltage comparison circuit detects that the voltage of the secondary battery becomes not less than a predetermined voltage V2, the charge controlling circuit stops applying a charge current for a predetermined time T2, and in addition when the voltage comparison circuit detects that the voltage of the secondary battery becomes less than a predetermined voltage V2—less than the voltage V2 within the time T2, the charge controlling circuit judges that the secondary battery is abnormally connected and performs an abnormality correction treatment.

Alternatively, in the integrated circuit, when the charge current detection circuit detects that the charge current applied to the secondary battery becomes less than a predetermined current i2, and further detects that the charge current becomes less than a predetermined current i1 less than the current i2 within a predetermined time T4, the charge controlling circuit judges that the secondary battery is abnormally connected and performs an abnormality correction treatment.

As another aspect of the present invention, a charging device for performing a constant current charging or a constant voltage charging to a secondary battery is provided which includes a charging transistor for controlling application of charge current to the secondary battery; and a charge controlling integrated circuit for controlling the charging transistor according to the information on the charge current applied to the secondary battery and the voltage of the secondary battery, wherein the charge controlling integrated circuit is the integrated circuit mentioned above.

As yet another aspect of the present invention, a method for determining whether a secondary battery is connected is provided which includes applying a charge current to a secondary battery through a charging transistor; stopping applying a charge current for the predetermined time T1 in the beginning of the charging operation while checking the voltage of the secondary battery within the time T1; and performing an abnormality correction treatment when the voltage of the secondary battery becomes less than the predetermined voltage V1 within the time T1.

Alternatively, a method for determining whether a secondary battery is connected is provided which includes applying a charge current to a secondary battery through a charging transistor; checking the voltage of the secondary battery; stopping applying a charge current for the predetermined time T2 when the voltage of the secondary battery becomes not less than the predetermined voltage V2; and performing an abnormality correction treatment when the voltage of the secondary battery becomes less than the predetermined voltage V2− less than the voltage V2 within the time T2.

Alternatively, a method for determining whether a secondary battery is connected is provided which includes applying a charge current to a secondary battery through a charging transistor; checking the current applied to the secondary battery for the predetermined time T4 when the current becomes less than the predetermined current i2; and performing an abnormality correction treatment when the current is less than the predetermined current i1 less than the current i2 within the predetermined time T4.

These and other objects, features and advantages of the present invention will become apparent upon consideration of the following description of the preferred embodiments of the present invention taken in conjunction with the accompanying drawings.

DETAILED DESCRIPTION OF THE INVENTION

Figure 1:
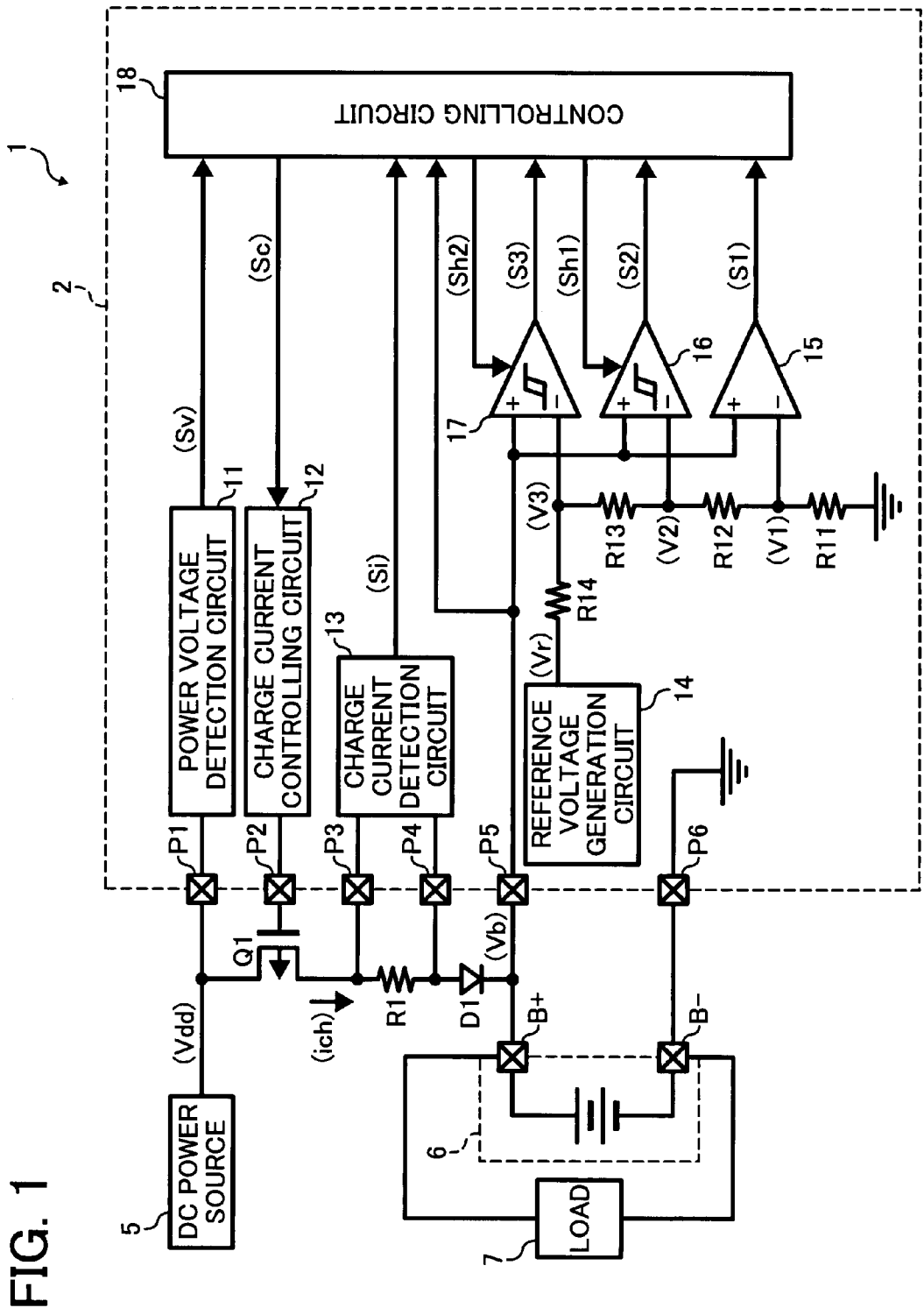
FIG. 1 is a schematic view illustrating an example embodiment of the charging device of the present invention.

The present invention relates to an integrated circuit for controlling charging of a secondary battery, which is used for a charging device and which applies a charge current to the secondary battery through a charging transistor to charge the secondary battery, wherein the integrated circuit controls the operation of the charging transistor.

In the first integrated circuit, the integrated circuit includes a charge current detection circuit which detects the charge current output from the charging transistor, and generates and outputs a signal including the charge current information; a voltage comparison circuit which compares the voltage of the secondary battery with one or more predetermined voltages, and generates and outputs a signal including the voltage comparison information; and a charge controlling circuit which controls the charging transistor according to information on the voltage of the secondary battery and the signals output from the charge current detection circuit and the voltage comparison circuit such that the charging transistor performs constant current charging in which a predetermined current is output or constant voltage charging in which a charge current is output so that the secondary battery has a predetermined charge voltage. In this integrated circuit, the charge controlling circuit stops applying a charge current for a predetermined time T1 in the beginning of charging of the secondary battery. When the voltage comparison circuit detects that the voltage of the secondary battery becomes less than a predetermined voltage V1 within the predetermined time T1, the charge controlling circuit judges that the secondary battery is abnormally connected and performs an abnormality correction treatment (such as stopping of application of charge current).

In addition, when the voltage comparison circuit detects that the voltage of the secondary battery becomes not less than a predetermined voltage V2 greater than the voltage V1, the charge controlling circuit stops applying a charge current for a predetermined time T2. In this regard, when the voltage comparison circuit detects that the voltage of the secondary battery becomes less than a predetermined voltage V2—, which is greater than the voltage V1 and less than the voltage V2, within the time T2, the charge controlling circuit judges that the secondary battery is abnormally connected and performs an abnormality correction treatment.

Further, when the charge current detection circuit detects that the charge current applied to the secondary battery becomes less than a predetermined current i2 and further detects that the charge current becomes less than a predetermined current i1 less than the current i2 within a predetermined time T4, the charge controlling circuit judges that the secondary battery is abnormally connected and performs an abnormality correction treatment.

Furthermore, when the voltage comparison circuit detects that the voltage of the secondary battery becomes not less than a predetermined voltage V3 greater than the voltage V2, the charge controlling circuit stops applying a charge current for a predetermined time T3. In this regard, when the voltage comparison circuit detects that the voltage of the secondary battery becomes less than a predetermined voltage V3−, which is greater than the voltage V2 and less than the voltage V3, within the time T3, the charge controlling circuit judges that the secondary battery is abnormally connected and performs an abnormality correction treatment.

Alternatively, another integrated circuit (second integrated circuit) is provided which includes the charge current detection circuit; the voltage comparison circuit; and the charge controlling circuit, wherein when the voltage comparison circuit detects that the voltage of the secondary battery becomes not less than the predetermined voltage V2, the charge controlling circuit stops applying a charge current to the secondary battery for the time T2, and wherein when the voltage comparison circuit detects that the voltage of the secondary battery becomes less than the voltage V2− less than the voltage V2 within the time T2, the charge controlling circuit judges that the secondary battery is abnormally connected and performs an abnormality correction treatment.

In this regard, when the charge current detection circuit detects that the charge current applied to the secondary battery becomes less than the current i2 and further detects that the charge current becomes less than the current i1 less than the current i2 within the predetermined time T4, the charge controlling circuit judges that the secondary battery is abnormally connected and performs an abnormality correction treatment.

In this integrated circuit, when the voltage comparison circuit detects that the voltage of the secondary battery becomes not less than the predetermined voltage V3 greater than the voltage V2, the charge controlling circuit stops applying a charge current for the predetermined time T3. In this regard, when the voltage comparison circuit detects that the voltage of the secondary battery becomes less than the predetermined voltage V3−, which is greater than the voltage V2 and less than the voltage V3, within the time T3, the charge controlling circuit judges that the secondary battery is abnormally connected and performs an abnormality correction treatment.

Alternatively, another integrated circuit (third integrated circuit) is provided which includes the charge current detection circuit; the voltage comparison circuit; and the charge controlling circuit, wherein when the charge current detection circuit detects that the charge current applied to the secondary battery becomes less than the current i2 and further detects that the charge current becomes less than the current i1 less than the current i2 within the time T4, the charge controlling circuit judges that the secondary battery is abnormally connected and performs an abnormality correction treatment.

In the first integrated circuit, the voltage comparison circuit can include a first comparator comparing the voltage of the secondary battery with the voltage V1 and generating and outputting a first signal S1 including the comparison information to the charge controlling circuit. The voltage comparison circuit can further include a second comparator comparing the voltage of the secondary battery with the voltage V2 and generating and outputting a second signal S2 including the comparison information to the charge controlling circuit. In this regard, the second comparator includes a first hysteresis controlled according to a control signal input from the charge controlling circuit, wherein the voltage V2− is the difference between the voltage V2 and the first hysteresis.

The voltage comparison circuit can further include a third comparator comparing the voltage of the secondary battery with the voltage V3 and generating and outputting a third signal S3 including the comparison information to the charge controlling circuit. In this regard, the third comparator includes a second hysteresis controlled according to an input control signal input from the charge controlling circuit, wherein the voltage V3− is the difference between the voltage V3 and the second hysteresis.

In the second integrated circuit, the voltage comparison circuit can include the second comparator or a combination of the second comparator and the third comparator.

The first to third integrated circuits can further include an input terminal which is connected with the secondary battery and to which the voltage of the secondary battery is input; and a current source which is connected with the input terminal while being controlled according to the control signals input from, the charge controlling circuit, wherein the charge controlling circuit controls drive of the current source according to an external control signal for controlling a consumption current of a load to which the secondary battery applies a power. In this regard, the charge controlling circuit allows the current source to operate when the external signal is a signal to reduce the consumption current is input while the charge current is not supplied to the secondary battery. In addition, when input of such an external signal is stopped, the charge controlling circuit stops the operation of the current source.

When the charge controlling circuit judges that the secondary battery is abnormally connected, the charge controlling circuit preferably stops applying a charge current to the secondary battery.

As another aspect of the present invention, a charging device for performing constant current charging or constant voltage charging on a secondary battery is provided which includes a charging transistor for controlling application of charge current to the secondary battery; and a charge controlling integrated circuit for controlling the charging transistor according to the information on the charge current applied to the secondary battery and the voltage of the secondary battery, wherein the charge controlling integrated circuit is the above-mentioned first, second or third integrated circuit.

As yet another aspect of the present invention, a method for determining whether a secondary battery is connected is provided which includes applying a charge current to a secondary battery through a charging transistor; and stopping applying a charge current for the predetermined time T1 in the beginning of the charging operation while checking the voltage of the secondary battery within the time T1. When the voltage of the secondary battery becomes less than the predetermined voltage V1 within the time T1, it is judged that the secondary battery is abnormally connected and the abnormality correction treatment is performed.

When the voltage of the secondary battery becomes less than the predetermined voltage V2 greater than the voltage V1, the method further includes stopping applying a charge current for the predetermined time T2 while checking the voltage of the secondary battery within the time T2. In this regard, when the voltage of the second battery becomes less than the predetermined voltage V2−, which is greater than the voltage V1 and less than the voltage V2, within the time T2, it is judged that the secondary battery is abnormally connected, and the abnormality correction treatment is performed.

In addition, the charge current may be checked. When the charge current becomes less than the predetermined current i2, the current is checked for the predetermined time T4. When the current becomes less than the current i1 less than the current i2 within the time T4, it is judged that the secondary battery is abnormally connected, and the abnormality correction treatment is performed.

Alternatively, a method for determining whether a secondary battery is connected is provided which includes applying a charge current to a secondary battery through a charging transistor; checking the voltage of the secondary battery; and stopping applying a charge current for the predetermined time T2 when the voltage of the secondary battery becomes not less than the voltage V2. When the voltage of the secondary battery becomes less than the predetermined voltage V2– less than the voltage V2 within the time T2, it is judged that the secondary battery is abnormally connected, and the abnormality correction treatment is performed.

In this regard, when the charge current becomes less than the predetermined current i2, the current is checked for the predetermined time T4. When the current becomes less than the predetermined current i1 less than the current i2 within the time T4, it is judged that the secondary battery is abnormally connected, and the abnormality correction treatment is performed.

Further, when the voltage of the secondary battery becomes not less than the predetermined voltage V3, the charge current to the secondary battery is stopped for the predetermined time T3. When the voltage becomes less than the predetermined voltage V3– greater than the voltage V2 and less than the voltage V3 within the time T3, it is judged that the secondary battery is abnormally connected, and the abnormality correction treatment is performed.

Alternatively, a method for determining whether a secondary battery is connected is provided which includes applying a charge current to a secondary battery through a charging transistor; and checking the current of the secondary battery. When the current becomes less than the predetermined current i2, the current is measured for the predetermined time T4. When the current becomes less than the predetermined current i1 less than the current i2 within the time T4, it is judged that the secondary battery is abnormally connected, and the abnormality correction treatment is performed.

When it is judged that the secondary battery is abnormally connected, it is preferable to stop application of the charge current to the secondary battery.

Next, the present invention will be explained in detail by reference to drawings.

First Example Embodiment

FIG. 1 is a schematic view illustrating an example embodiment of the charging device of the present invention for charging a secondary battery.

Referring to FIG. 1, a charging device 1 has a DC power source 5 such as AC adaptors and performs constant current charging or constant voltage charging on a secondary battery 6 (hereinafter referred to as a battery) such as lithium ion batteries. The battery 6 is connected with a load 7 and applies an electric power to the load 7.

The charging device 1 includes a power transistor Q1 for applying a current to the battery 6 according to a signal input to a base thereof to charge the battery, wherein the power transistor includes a PMOS transistor; and a resistor R1 configured to detect a current ich applied by the power transistor Q1 to the battery 6. In addition, the charging device 1 further includes a diode D1 configured to prevent backflow of current from the battery 6 to the DC power source 5; and a charge controlling circuit 2 configured to control the operation of the power transistor Q1 so as to perform constant current charging or constant voltage charging on the battery 6 according to information on a voltage Vb of the battery 6 and the charge current ich, which can be determined from the voltage of both the ends of the resistor R1.

The charge controlling circuit 2 is integrated in an IC, and includes a terminal P1 connected with the DC power source; a terminal P2 for outputting a charge controlling signal; a first current detection terminal P3; a second current detection terminal P4; and terminals P5 and P6 connected with the battery 6, wherein the terminal P6 is grounded. The battery 6 has battery terminals B+ and B–. The battery terminal B+, which is connected with a positive electrode of the battery 6, is connected with the terminal P5, and the battery terminal B–, which is connected with a negative electrode of the battery 6, is connected with the terminal P6.

In addition, the charge controlling circuit 2 includes a power voltage detection circuit 11 for determining whether a power is applied from the DC power source 5; a charge current controlling circuit 12 for controlling the operation of the power transistor Q1 according to the input control signal; a charge current detection circuit 13 for determining the charge current ich from the voltage difference between the terminals of the resistor R1.

Further, the charge controlling circuit 2 includes a reference voltage generating circuit 14 configured to generate and output a predetermined reference voltage Vr; a comparator 15; comparators 16 and 17 each having a hysteresis corresponding to the input control signal; resistors R11-R14; and a controlling circuit 18 configured to control the operation of the charge current controlling circuit 12 and the hysteresis of each of the comparators 16 and 17.

In this regard, the power transistor Q1 serves as the charging transistor, and the charge controlling circuit 2 serves as the integrated circuit for controlling charging of a secondary battery. In addition, the reference voltage generation circuit 14, and comparators 15-17, resistors R11-R14 constitute the voltage comparison circuit. Further, the charge current controlling circuit 12 and the controlling circuit 18 constitute the charge controlling circuit. Furthermore, the comparators 15, 16 and 17 are the first, second and third comparators, respectively.

The supply voltage Vdd applied by the DC power source 5 is input to the power voltage detection circuit 11 via the terminal P1 while input to the source of the power transistor Q1. The gate of the power transistor Q1 is connected with the charge current controlling circuit 12 via the terminal P2. The power voltage detection circuit 11 outputs a predetermined signal Sv to the controlling circuit 18 when the voltage of the terminal P1 becomes not less than a predetermined voltage to inform that a power is supplied from the DC power source 5. The charge current controlling circuit 12 outputs a charge controlling signal to the gate of the power transistor Q1 via the terminal P2 upon reception of a control signal Sc from the controlling circuit 18 to control the charge current ich.

The drain of the power transistor Q1 is connected with an anode of the diode D1 via the resistor R1. The cathode of the diode D1 is connected with each of the battery terminal B+ and the terminal P5. The drain of the power transistor Q1 is connected with the first current detection terminal P3. The resistor R1 is connected with the first current detection terminal P3 and the second current detection terminal P4. The charge current detection circuit 13 determines the current ich from the voltage difference between both the ends of the resistor R1 (i.e., the difference between the voltage applied to the first current detection terminal P3 and the voltage applied to the second current detection terminal P4), and outputs a signal S1 including the detected current information to the controlling circuit 18.

The resistors R14, R13, R12 and R11 are serially connected between the reference voltage Vr output from the reference voltage generation circuit 14 and the ground voltage. A first voltage V1, which is the voltage at the connection point between the resistors R11 and R12, is input to an inverting input terminal of the comparator 15. A second voltage V2, which is the voltage at the connection point between the resistors R12 and R13, is input to an inverting input terminal of the comparator 16. A third voltage V3, which is the voltage at the connection point between the resistors R13 and R14, is input to an inverting input terminal of the comparator 17. Each of a first voltage detection signal S1 which is output from the comparator 15, a second voltage detection signal S2 which is output from the comparator 16, and a third voltage detection signal S3 which is output from the comparator 17, is output to the controlling circuit 18.

In addition, the controlling circuit 18 inputs a first control signal Sh1 for controlling the hysteresis of the comparator 16 and a second control signal Sh2 for controlling the hysteresis of the comparator 17 to the comparator 16 and the comparator 17, respectively.

The comparator 15 compares the battery voltage Vb, which is the voltage at the terminal P5, with the first voltage V1. When the battery voltage Vb becomes not less than the first voltage V1, the first voltage detection signal S1 output from the comparator 15 is changed from a low level to a high level. In contrast, when the battery voltage Vb becomes less than the first voltage V1, the first voltage detection signal S1 is changed from a high level to a low level.

The comparator 16 compares the battery voltage Vb with the second voltage V2. When Vb is not less than V2, the second voltage detection signal S2 output from the comparator 16 is changed from a low level to a high level. When Vb is less than V2−, which is obtained by subtracting the hysteresis voltage of the comparator 16 from the second voltage V2, the second voltage detection signal S2 output from the comparator 16 is changed from a high level to a low level. The comparator 16 has an input terminal, through which the first control signal Sh1 is input from the controlling circuit 18, to set the hysteresis voltage to a desired value according to the control signal Sh1.

The comparator 17 compares the battery voltage Vb with the third voltage V3. When Vb is not less than V3, the third voltage detection signal S3 output from the comparator 17 is changed from a low level to a high level. When Vb is less than V3−, which is obtained by subtracting the hysteresis voltage of the comparator 17 from the third voltage V3, the third voltage detection signal S3 output from the comparator 17 is changed from a high level to a low level. The comparator 17 has an input terminal, through which the second control signal Sh2 is input from the controlling circuit 18, to set the hysteresis voltage to a desired value according to the control signal Sh2.

The controlling circuit 18 is constituted of a logic circuit, and determines the charging mode on the basis of the output signal Sv output from the power voltage detection circuit 11, the output signal S1 output from the charge current detection circuit 13, and the first, second and third voltage detection signals S1, S2 and S3 output from the comparators 15, 16 and 17, respectively. In addition, the controlling circuit 18 determines whether or not charging is performed, and controls the charge current, and the charge voltage via the charge current controlling circuit 12 using the control signal Sc.

Figure 2:
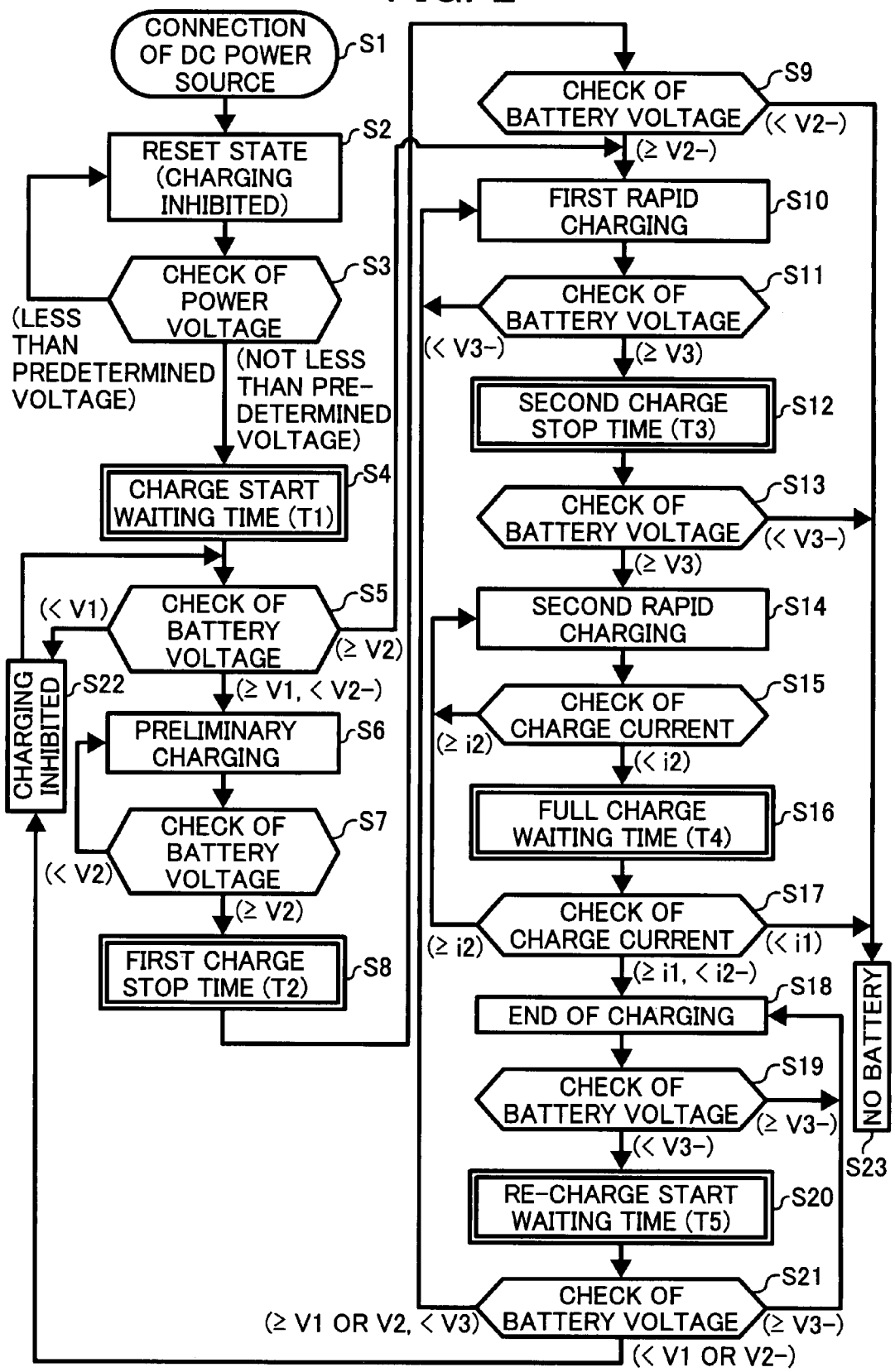
FIG. 2 is a flowchart illustrating the operations of the charging device illustrated in FIG. 1.
Figure 3:
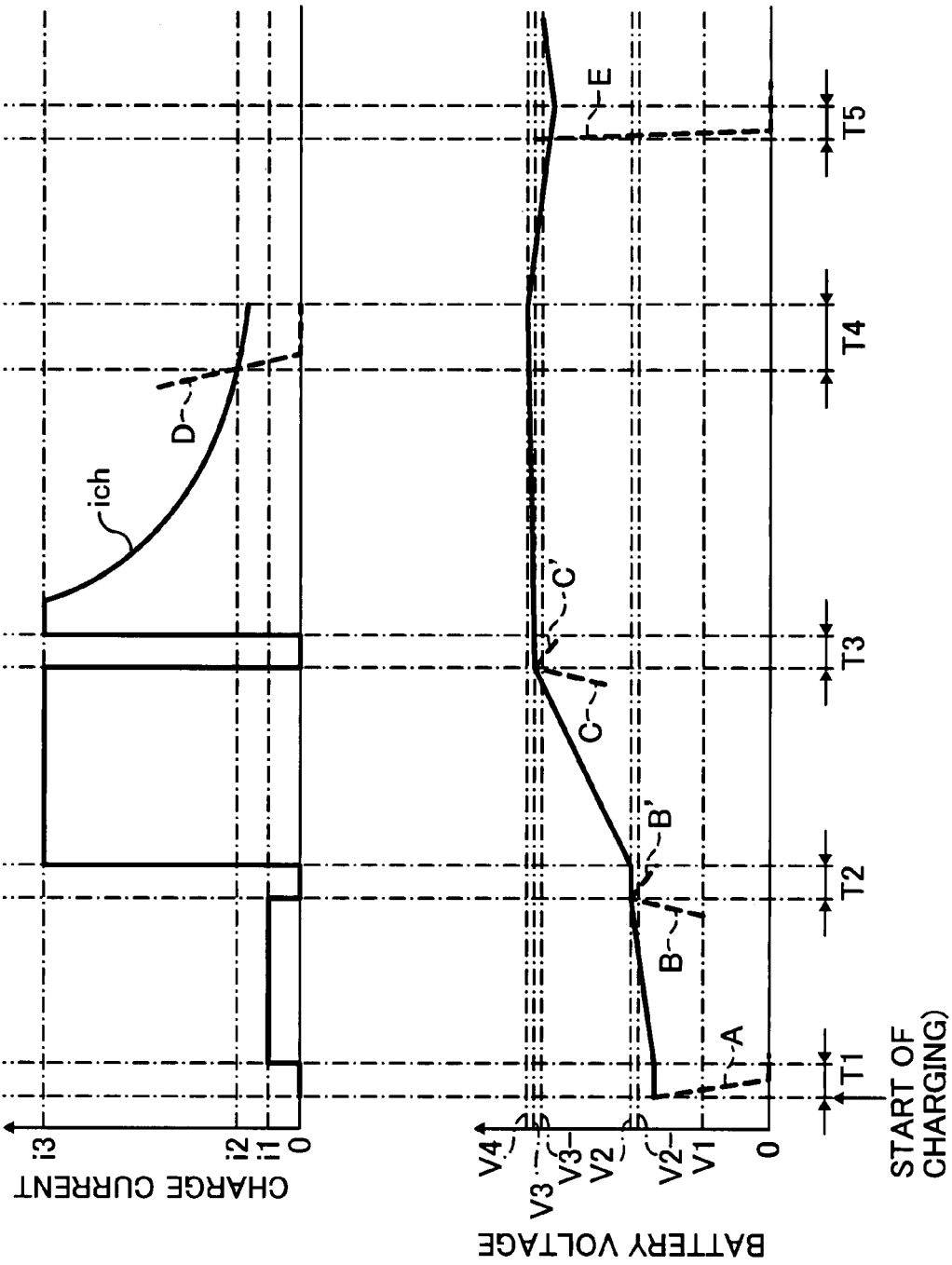
FIG. 3 is a graph illustrating the relationship between the charge current (ich) and the voltage (Vb) of the battery in the charging device illustrated in FIG. 1.

FIG. 2 is a flowchart of the operations of the charging device 1 illustrated in FIG. 1. FIG. 3 is a graph illustrating change of the charge current ich and the battery voltage Vb with time in the charging device illustrated in FIG. 1. The operations of the charging device illustrated in FIG. 1 will be explained by reference to FIGS. 2 and 3.

At first, the connection confirmation operation of the secondary battery in the beginning of the charging operation will be explained.

Referring to FIG. 2, when the DC power source 5 is connected with the charge controlling circuit 2 in step S1, the controlling circuit 18 allows the charge current controlling circuit 12 to perform a reset operation, i.e., to turn off the power transistor Q1 so as to have a shutoff state, in step S2. In step S3, the power voltage detection circuit 11 checks the power voltage Vdd applied from the DC power connection terminal P1.

When the power voltage Vdd is less than a predetermined voltage in step S3, the operation returns to step S2. When the power voltage Vdd is not less than the predetermined voltage in step S3, the controlling circuit 18 allows the charge current controlling circuit 12 to turn off the power transistor Q1 so as to have a shutoff state for a predetermined charge start waiting time T1 (step S4), resulting in stopping applying the charge current ich. Then the controlling circuit 18 checks the battery voltage Vb on the basis of the first, second and third voltage detection signals S1, S2 and S3 (step S5).

When the battery voltage Vb is less than the first voltage V1 in step S5, the operation proceeds to step S22, in which the controlling circuit 18 judges that the battery 6 is not connected or the battery 6 is abnormal. In this case, the controlling circuit 18 continuously allows the charge current controlling circuit 12 to turn off the power transistor Q1 so as to have a shutoff state after the predetermined charge start waiting time T1, resulting in stopping of the charge current ich (i.e., stopping of charging of the battery 6), followed by re-execution of step S5. When a voltage not less than the first voltage V1 is input to the battery connection terminal P5 (when a normal secondary battery is connected, the voltage is not less than the first voltage V1), the first voltage detection signal S1 output from the comparator 15 is on a high level. When the battery voltage Vb is not less than the first voltage V1 and less than the voltage V2− in step 5, the operation proceeds to step S6, in which the controlling circuit 18 allows the charge current controlling circuit 12 to perform a preliminary charge mode operation.

In the preliminary charging mode operation, charging is performed while flowing a relatively small amount of current of tens of milliamp until the battery voltage reaches a predetermined voltage. This is because when charging is performed on a lithium-ion battery in an over-discharge state while flowing a large amount of current, a problem such as generation of heat or fire may occur. In FIG. 3, a character "i1" denotes the charge current in the preliminary charging.

When the battery voltage Vb is not less than the voltage V2 in step S5, the output signal S2 output from the comparator 16 is changed from a low level to a high level, and the operation proceeds to step S10 in which charging is performed in a constant current charging mode. In this regard, the voltage V1 is set to a minimum voltage above which the preliminary charging can be performed, and the second voltage V2 is set to a minimum voltage above which rapid charging flowing a large amount of current can be performed.

The charge start waiting time T1 is an extremely short time on the order of a few milliseconds. However, when no battery or an abnormal battery such as shorted batteries is connected while the DC power source 5 is connected, the voltage rapidly decreases as illustrated by a dotted line A even if the voltage of the battery terminal P5 is not less than the voltage V1. Specifically, the voltage becomes less than the voltage V1 (almost 0 V) within the waiting time T1. Therefore, when the first voltage detection signal S1 sent from the comparator 15 is on a low level after the waiting time T1 in step S5, the controlling circuit 18 judges that no battery or a shorted battery is connected, and inhibits charging (in step S22). Even when the charging device is in the charge inhibition state in step 22, the battery voltage checking operation in step S5 is performed. Therefore, when the battery voltage Vb becomes not less than the voltage V1 and the first voltage detection signal S1 sent from the comparator 15 is changed to a high level, charging is performed on the battery.

Next, the battery connection confirmation operation in transition from the preliminary charge mode operation to the first rapid charge mode operation (i.e., a constant current charging mode operation) will be explained.

During the preliminary charging is performed (step S6), the controlling circuit 18 performs the operation in step S7, i.e., checks the battery voltage. When the battery voltage Vb becomes not less than the voltage V2, the second voltage detection signal S2 output from the comparator 17 is changed from a low level to a high level, and the operation proceeds to step S8 (i.e., the first charge stop time T2). The first charge stop time is represented as T2 in FIG. 3. In the first charge stop time T2, the controlling circuit 18 outputs a signal to stop the charge current ich to the charge current controlling circuit 12. The first charge stop time T2 is an extremely short time on the order of a few milliseconds. When a normal battery is connected, the battery voltage Vb hardly changes in the first charge stop time T2 as illustrated by a solid line in FIG. 3.

When the battery 6 is removed from the charging device in the preliminary charging operation, the voltage at the battery connection terminal P5 rapidly increases to the second voltage V2 as illustrated by a dotted line B, and thereby the second voltage detection signal S2 from the comparator 16 is changed to a low level to a high level. However, in this case, application of the charge current ich is stopped, the voltage at the battery connection terminal P5 rapidly decreases so as to be lower than the voltage V2-, which is obtained by subtracting the hysteresis voltage of the comparator 16 from the second voltage V2 as illustrated by a dotted line B'. Therefore, the second voltage detection signal S2 from the comparator 16 is changed to a high level to a low level.

In the first charge stop time T2, the controlling circuit 18 checks the battery voltage (step S9). When the battery voltage Vb is not less than the voltage V2- and the second voltage detection signal S2 from the comparator 16 maintains the high level, the operation proceeds to step 10, i.e., the first rapid charge mode operation is performed.

In the first rapid charge mode operation, the battery 6 is subjected to constant current charging applying a large amount of current so as to be rapidly charged. In FIG. 3, the charge current in the first rapid charge mode operation is represented as i3.

As mentioned above, in a case where the battery is removed from the charging device, the battery voltage Vb becomes less than the voltage V2- in step S-9 and the second voltage detection signal S2 is changed to a low level. In this case, the controlling device 18 judges that there is no battery, and performs a predetermined abnormality detection operation (in step S23), e.g., the controlling device 18 allows the charge current controlling circuit 12 to turn off the power transistor Q1 so that the power transistor achieves a shutoff state.

Next, the battery connection confirmation operation in transition from the first rapid charge mode operation to the second rapid charge mode (i.e., a constant voltage charge mode operation) will be explained.

During the controlling circuit 18 allows the power transistor Q1 to perform the first rapid charge mode operation via the charge current controlling circuit 12 (step 10), the controlling circuit 18 always checks the battery voltage Vb (step 11). When the battery voltage Vb is not less than the third voltage V3, the third voltage detection signal S3 output from the comparator 17 is changed from a low level to a high level and the charging device has a second charge stop time T3, which is represented as T3 in FIG. 3.

In the second charge stop time T3, the controlling circuit 18 allows the charge current controlling circuit 12 to stop application of the charge current ich by the power transistor Q1.

The second charge stop time T3 is an extremely short time on the order of a few milliseconds. In this case, a normal battery is connected, the battery voltage Vb hardly changes in the second charge stop time T3 as illustrated by a solid line in FIG. 3. However, when the battery 6 is removed from the charging device in the first rapid charging operation, the voltage at the battery terminal P5 rapidly increases as illustrated by a dotted line C in FIG. 3. When the voltage reaches the voltage V3, the third voltage detection signal S3 from the comparator 17 is changed from a low level to a high level. In this case, when application of the charge current ich is stopped, the voltage at the battery terminal P5 rapidly decreases as illustrated by a dotted line C'. When the voltage at the battery terminal P5 becomes lower than the voltage V3-, which is obtained by subtracting the hysteresis voltage of the comparator 17 from the third voltage, the third voltage detection signal S3 is changed from a high level to a low level.

Therefore, in the second charge stop time T3, the controlling circuit 18 checks the battery voltage Vb (step 13). When it is found from the third voltage detection signal S3 that the battery voltage Vb is not less than the voltage V3- in step S13, the second rapid charge mode operation (i.e., a constant voltage charging operation) in step S14 is performed on the battery. It is clear from the charge current curve in FIG. 3 that the charge current ich gradually decreases in the second rapid charge mode operation. In the second rapid charge mode operation, the controlling circuit 18 always checks the charge current ich on the basis of the output signal Si sent from the charge current detection circuit 13 (step S15).

As mentioned above, in a case where the battery is removed from the charging device in the first rapid charge mode operation, the battery voltage Vb becomes less than the voltage V3—in step 13 and the third voltage detection signal S3 is changed to a low level, the controlling circuit 18 determines that no battery is connected and the operation proceeds to step 23.

Next, the battery connection confirmation operation on completion of charging will be explained.

As mentioned above, the controlling circuit 18 always checks the charge current ich in the second rapid charging mode in step 14. When the charge current ich is less than a current i2 (i.e., a full charge current) which is less than the current i3 in the first rapid charge mode operation and not less than the current i1 in the preliminary charging, the charging device has a full charge waiting time T4, which is represented as T4 in FIG. 3 and in which the charge current ich is still applied to the battery.

The full charge waiting time T4 is an extremely short time on the order of a few milliseconds. When a normal battery is connected, change of the charge current ich in the full charge waiting time T4 is little as illustrated by a solid line in FIG. 3.

However, when the battery is, removed from the charging device in the second rapid charge mode operation, the charge current ich rapidly decreases so as to be less than the current i1 in the preliminary charging as illustrated by a dotted line D in FIG. 3. When the charge current ich is not less than the current i1 and less than the current i2 in the full charge waiting time T4, the controlling circuit 18 determines that the battery is fully charged and the operation proceeds to step 18 (i.e., the charging operation is ended). When the charge current ich becomes lower than the current i1 in the full charge waiting time T4, the controlling circuit determines that no battery is connected, and the operation proceeds to step 23.

Next, connection confirmation operation in the beginning of re-charging will be explained.

The controlling circuit 18 checks the battery voltage Vb (step 19) even at the end of charging (step 18). When the battery voltage Vb becomes lower than the voltage V3−, which is obtained by subtracting the hysteresis voltage of the comparator 17 from the third voltage V3, the third voltage detection signal S3 from the comparator 17 is changed to a low level, and thereby the charging device has a re-charge start waiting time T5 (step S20), which is represented as T5 in FIG. 3 and in which the charge current ich is not applied. Since the re-charge start waiting time T5 is an extremely short time on the order of a few milliseconds, change of the battery voltage is little in the re-charge start waiting time T5 if a normal battery 6 is connected as illustrated by a solid line in FIG. 3. However, when the battery is removed from the charging device at the end of charging, the battery voltage Vb rapidly decreases as illustrated by a dotted line E in FIG. 3 and the second voltage detection signal S2 from the comparator 16 or the first voltage detection signal S1 from the comparator 15 is changed to a low level.

Therefore, the controlling circuit 18 checks the battery voltage Vb in the re-charge start waiting time T5. When the second voltage detection signal S2 from the comparator 16 is on a high level, the controlling circuit 18 judges that the battery voltage Vb decreases while the battery is still connected and the operation in step S10 is re-executed (i.e., the constant current charging operation is performed). When the second voltage detection signal S2 from the comparator 16 is on a low level or the first voltage detection signal S1 from the comparator 15 is on a low level, the controlling circuit 18 judges that the battery 6 is removed therefrom or the battery has a short-circuit state, and the operation proceeds to step S22. In addition, when the third voltage detection signal S3 is on a high level, the operation returns to step S18, in which the controlling circuit 18 checks again the battery voltage Vb.

In determination whether the battery is connected in the beginning of re-charging, whether to use the output signal from the comparator 15 or the output signal from the comparator 16 is determined while considering the relationship between the re-charge start waiting time T5 and the voltage dropping speed at the battery connection terminal P5 when the battery is removed. Specifically, when the voltage at the terminal P5 gradually decreases or the re-charge start waiting time T5 is so short that it is not expected that the voltage at the terminal P5 reaches the second voltage V2 in the re-charge start waiting time, the second voltage detection signal S2 from the comparator 16 should be used therefor. In contrast, when it is not expected that the voltage at the terminal P5 reaches the first voltage V1 in the re-charge start waiting time T5, the first voltage detection signal S1 from the comparator 15 should be used therefor.

Thus, in the first example embodiment of the charging device of the present invention, the voltage at the battery connection terminal P5 or the charge current ich is checked at the five waiting/stop times T1-T5 to determine whether a battery is connected. Therefore, it is not necessary to perform intermittent charging and it is possible to charge an over-discharge battery. In conventional charging devices, the waiting/stop times have been used for confirming change of the charging modes. In addition, the voltages and currents, which are used for judging connection of a battery in the present invention, have been measured for judging whether the charging mode is changed in conventional constant current-constant voltage charging methods. Therefore, only by substituting some of the conventional comparators with hysteresis comparators, connection of a secondary battery can be confirmed. Therefore, problems such as increase in size of the charging device and increase in manufacturing costs can be avoided.

Further, the hysteresis voltages of the comparators 16 and 17 can be set to desired voltages by the control signals from the controlling circuit 18. Specifically, the hysteresis voltages should be set to proper voltages in consideration of the battery to be charged, and the charging conditions such as charge current. Therefore, this charging device can be used for charging various secondary batteries.

Furthermore, if it is not necessarily perform the battery connection confirmation operation at each of the waiting/stop times T1-T5, it is possible to perform a battery connection confirmation operation at desired points of the waiting/stop times T1-T5. In addition, it is possible to form all the battery connection confirmation programs or some of the battery connection confirmation programs in the IC in which the charge controlling circuit 2 is formed. In this case, selection of the connection confirmation method suitable for the application is performed in the manufacturing process of the IC, for example, by using a method such as cutting a trimming fuse.

In addition, it is possible to properly set the first voltage V1, the second voltage V2, the third voltage V3, the first current i1, the second current i2, the third current i3, and the waiting/stop times T1-T5 by a trimming method in the manufacturing process. By using this manufacturing method, the resultant IC, which is constituted of only one kind of circuit, can be used for various charging applications.

Further, a terminal for external signals can be added to the charging IC so that the charging conditions and/or the connection confirmation conditions of the charging IC can be changed by an external signal. By using this method, the resultant IC can be used for various charging applications.

Second Example Embodiment

In the first example embodiment, the impedance between the battery connection terminal P5 and the ground terminal P6 is considerably high. Therefore, there is a large stray capacitance due to the wire connecting the terminal P5 with the terminal P6, resulting occurrence of a problem in that a charge is stored in the stray capacitance, thereby generating a voltage between the terminals P5 and P6. In general, the stray capacitance is very small and therefore the generated voltage is discharged shortly. However, in the above-mentioned case where the impedance is very large, a problem in that the generated voltage cannot be discharged in a waiting/stop time may occur. Therefore, it is preferable to turn on a current load 20 (illustrated in FIG. 4) in the waiting/stop times T1, T2, T3 and T5 to discharge the charges stored in the stray capacitance. In this case, connection of the battery 6 can be detected more securely. Next, the second example embodiment will be explained by reference to drawings.

Figure 4:
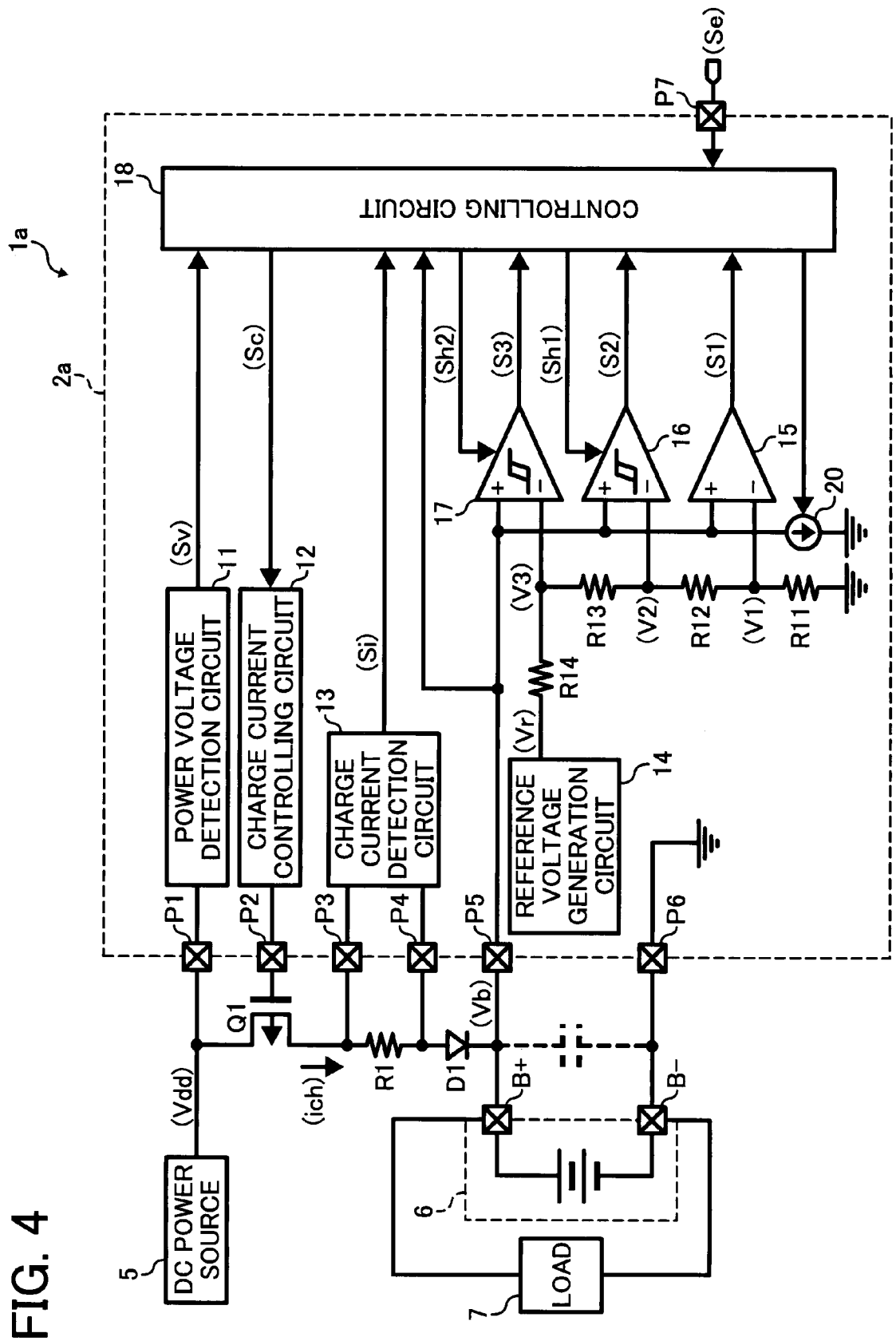
FIG. 4 is a schematic view illustrating another example embodiment of the charging device of the present invention.

FIG. 4 is a schematic view illustrating the second example embodiment of the charging device of the present invention. In FIGS. 1 and 4, like reference characters designate like corresponding parts. The explanation of the parts illustrated in FIG. 1 is omitted or briefly explained here and the differences between the devices illustrated in FIGS. 1 and 4 will be mainly explained.

The differences therebetween are as follows.

(1) The current load 20 is inserted between the battery connection terminal P5 and the ground terminal P6; and (2) An input terminal P7, through which an external signal is input to the controlling circuit 18, is provided in the charge controlling circuit 2.

Due to these differences, the charging device and the charge controlling circuit illustrated in FIG. 4 have reference numerals 1a and 2a, respectively. The current load 20 serves as a current source.

In FIG. 4, the charging device 1a includes the DC power source 5 (such as AC adaptors), and charges the secondary battery 6 (such as lithium-ion batteries) by performing constant current charging or constant voltage charging.

The charging device 1a includes the power transistor Q1, the resistor R1, the diode D1, and the charge controlling circuit 2a, which controls the power transistor Q1 so as to perform constant current charging or constant voltage charging on the battery 6 on the basis of the information on the battery voltage Vb and the charge current ich obtained from the difference in voltage between the first and second charge current detection terminals P3 and P4.

The charge controlling circuit 2a, which is integrated in one integrated circuit, includes the DC power connection terminal P1, the charge control signal output terminal P2, the first current detection terminal P3, the second current detection terminal P4, the battery connection terminal P5, the ground terminal P6, and the external signal input terminal P7. An external signal Se such as sleep signals to allow the load 7 to achieve a sleep state is input to the external signal input terminal P7. In addition, the charge controlling circuit 2a includes the power voltage detection circuit 11, the charge current controlling circuit 12, the charge current detection circuit 13, the reference voltage generation circuit 14, the comparators 15-17, the resistors R11-R14, the controlling circuit 18, and the current load 20 which is subjected to drive control according to the control signal from the controlling circuit 18.

The current load 20 is inserted between the terminals P5 and P6, and the control signal is input to the control terminal of the current load 20 from the controlling circuit 18 to perform drive control on the current load 20 according to the control signal. Upon reception of the external signal Se, the controlling circuit 18 turns on the current load 20 in the waiting/stop times T1, T2, T3 and T5. In other periods, the controlling circuit 18 turns off the current load 20 independently of the external signal Se. When the current load 20 is turned on, a predetermined current flows through the current load 20. When the current load 20 is turned off, the current load achieves a shutoff state.

In this second example embodiment, when the external signal Se to allow the load 7 to achieve a sleep state is input through the external signal input terminal P7, the controlling circuit 18 turns on the current load 20 in each of the waiting/stop times T1, T2, T3 and T5, and turns off the current load 20 in other periods.

In general, the impedance between the battery terminal P5 and the ground terminal P6 in the charge controlling circuit 2a is considerably high. In addition, there is a large stray capacitance due to the wire connecting the terminal P5 with the terminal P6. Therefore, charges are stored in the stray capacitance, thereby generating a voltage between the terminals P5 and P6. In general, the stray capacitance is very small and therefore the generated voltage is discharged shortly. However, in the above-mentioned case where the impedance is very large, there is a possibility that the generated voltage cannot be discharged in a waiting/stop time. Therefore, in this example embodiment, the current load 20 (illustrated in FIG. 4) is turned on in each of the waiting/stop times T1, T2, T3 and T5 to discharge the charges stored in the stray capacity and to securely detect connection of the battery 6. The current flown through the current load 20 due to discharging is from 0 to a few milliamp. It is preferable to determine the current (i.e., to choose a proper current) in the manufacturing process of the charging device in consideration of the impedance and stray capacitance or to determine the current by inputting an external signal from the external signal input terminal P7. Upon reception of the external signal Se, the controlling circuit 18 determines the effective (or ineffective) waiting/stop times among the waiting/stop times T1-T5; the current in the current load 20; and other targets such as the first to third voltages V1-V3, and first to third currents i1-i3, and the period of the selected waiting/stop times.

Figure 5:
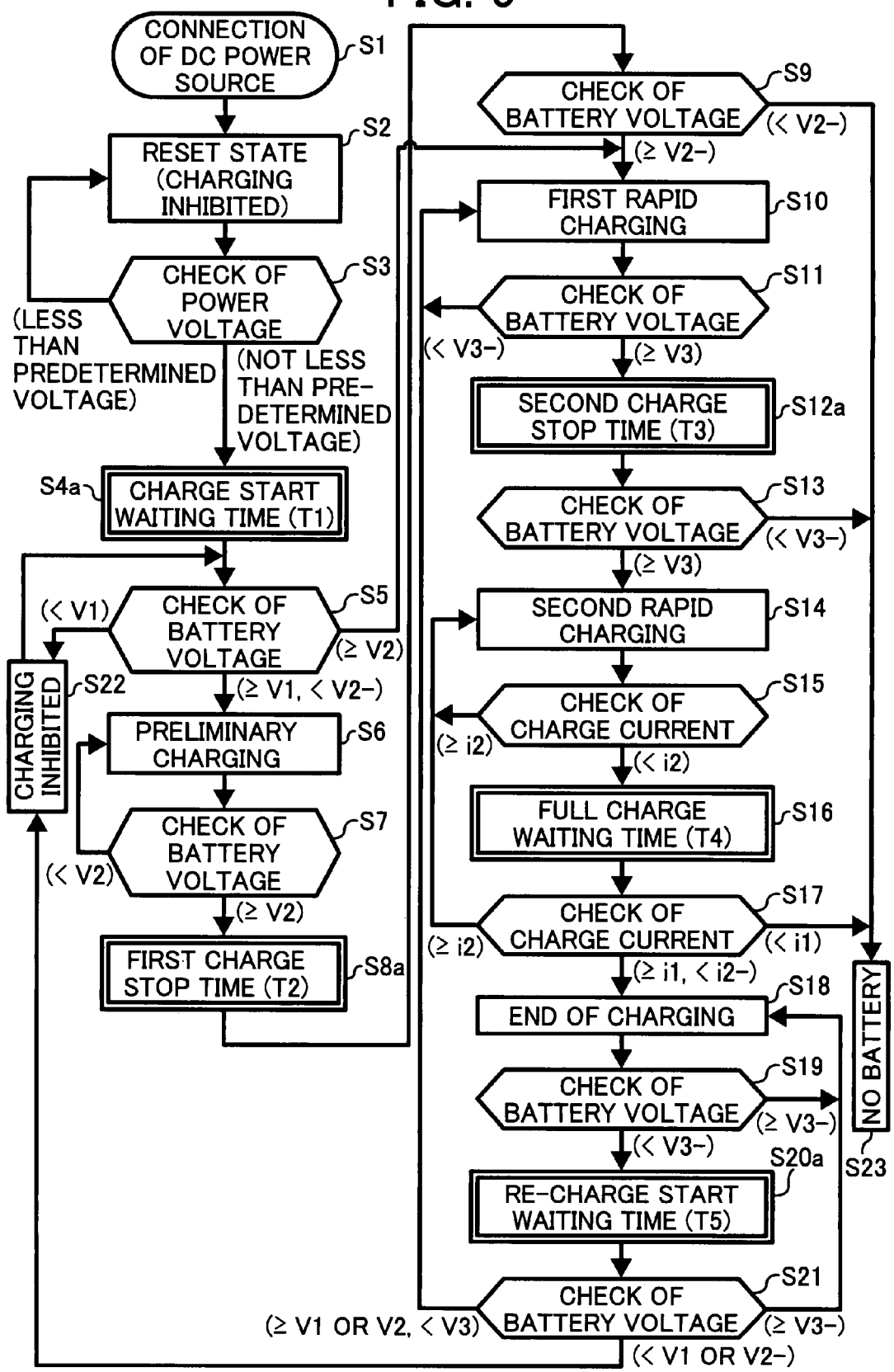
FIG. 5 a flowchart illustrating the operations of the charging device illustrated in FIG. 4.

FIG. 5 is a flowchart illustrating the operations of the charging device illustrated in FIG. 4. In FIGS. 2 and 5, like reference characters designate like corresponding operations. The explanation of the operations illustrated in FIG. 2 is omitted or briefly explained here and the differences between the operations illustrated in FIGS. 2 and 5 will be mainly explained. FIG. 3 can also be used for the charging device illustrated in FIG. 4.

The differences therebetween are as follows.

(1) In the operations illustrated in FIG. 5, the current load is turned on in each of steps S4a, S8a, S12a and S20a.

Specifically, in each of steps S4a, S8a, S12a and S20a, the controlling circuit 18 turns on the current load 20 upon reception of the external signal Se to allow the load 7 to achieve a sleep state through the external signal input terminal P7.

Thus, in this second example embodiment, the current load 20, which can discharge charges stored in the stray capacitance present between the terminals P5 and P6, is added to the charge controlling circuit of the first example embodiment of the charging device. Therefore, in addition to the effect of the first example embodiment charging device, the second example embodiment charging device has an advantage such that connection of a battery can be detected more securely. In addition, the charging conditions and battery connection confirmation conditions can be freely set by an external signal. Therefore, the charging device can be used for various applications even though the charging device uses only one kind of IC.

This document claims priority and contains subject matter related to Japanese Patent Application No. 2006-052699, filed on Feb. 28, 2006, incorporated herein by reference.

Having now fully described the invention, it will be apparent to one of ordinary skill in the art that many changes and modifications can be made thereto without departing from the spirit and scope of the invention as set forth therein.

What is claimed is:

1. An integrated circuit for charging a secondary battery via a charging transistor, comprising:

a charge current detection circuit which detects a charge current output from the charging transistor, and generates and outputs a signal including the charge current information;

a voltage comparison circuit which compares a voltage of the secondary battery with one or more predetermined voltages, and generates and outputs a signal including the voltage comparison information; and a charge controlling circuit which controls the charging transistor according to information on the voltage of the secondary battery and the signals output from the charge current detection circuit and the voltage comparison circuit such that the charging transistor performs constant current charging in which a predetermined current is output or constant voltage charging in which a charge current is output so that the secondary battery has a predetermined voltage, wherein the charge controlling circuit stops applying a charge current for a predetermined time T1 in beginning of charging of the secondary battery, wherein, when the voltage comparison circuit detects that the voltage of the secondary battery becomes less than a predetermined voltage V1 within the predetermined time T1, the charge controlling circuit judges that the secondary battery is abnormally connected and performs an abnormality correction treatment, wherein when the voltage comparison circuit detects that the voltage of the secondary battery becomes not less than a predetermined voltage V2 greater than the voltage V1, the charge controlling circuit stops applying a charge current for a predetermined time T2, and wherein, when the voltage comparison circuit detects that the voltage of the secondary battery becomes less than a predetermined voltage V2−, which is greater than the voltage V1 and less than the voltage V2, within the time T2, the charge controlling circuit judges that the secondary battery is abnormally connected and performs an abnormality correction treatment.

2. The integrated circuit according to claim 1, wherein the voltage comparison circuit includes:

a first comparator which compares the voltage of the secondary battery with the voltage V1, and generates and outputs a first signal S1 including the comparison information to the charge controlling circuit; and a second comparator which compares the voltage of the secondary battery with the voltage V2 and generates and outputs a second signal S2 including the comparison information to the charge controlling circuit, wherein the second comparator has a hysteresis controlled according to a control signal input from the charge controlling circuit, and wherein the voltage V2− is a difference between the voltage V2 and the hysteresis.

3. The integrated circuit according to claim 1, wherein, when the charge current detection circuit detects that the charge current applied to the secondary battery becomes less than a predetermined current i2, and further detects that the charge current becomes less than a predetermined current i1 less than the current i2 within a predetermined time T4, the charge controlling circuit judges that the secondary battery is abnormally connected and performs an abnormality correction treatment.

4. The integrated circuit according to claim 3, wherein:

when the voltage comparison circuit detects that the voltage of the secondary battery becomes not less than a predetermined voltage V3 greater than the voltage V2, the charge controlling circuit stops applying a charge current for a predetermined time T3, and when the voltage comparison circuit detects that the voltage of the secondary battery becomes less than a voltage V3−, which is greater than the voltage V2 and less than the voltage V3, within the time T3, the charge controlling circuit judges that the secondary battery is abnormally connected and performs an abnormality correction treatment.

5. The integrated circuit according to claim 4, wherein the voltage comparison circuit includes:

a first comparator which compares the voltage of the secondary battery with the voltage V1, and generates and outputs a first signal S1 including the comparison information to the charge controlling circuit;

a second comparator which compares the voltage of the secondary battery with the voltage V2 and generates and outputs a second signal S2 including the comparison information to the charge controlling circuit; and a third comparator which compares the voltage of the secondary battery with the voltage V3 and generates and outputs a third signal S3 including the comparison information to the charge controlling circuit, wherein the second and third comparators have a first hysteresis and a second hysteresis, respectively, controlled according to control signals input from the charge controlling circuit, and wherein the voltage V2− is a difference between the voltage V2 and the first hysteresis, and the voltage V3− is a difference between the voltage V3 and the second hysteresis.

6. An integrated circuit for charging a secondary battery via a charging transistor, comprising:

a charge current detection circuit which detects a charge current output from the charging transistor, and generates and outputs a signal including the charge current information;

a voltage comparison circuit which compares a voltage of the secondary battery with one or more predetermined voltages, and generates and outputs a signal including the voltage comparison information; and a charge controlling circuit which controls the charging transistor according to information on the voltage of the secondary battery and the signals output from the charge current detection circuit and the voltage comparison circuit such that the charging transistor performs constant current charging in which a predetermined current is output or constant voltage charging in which a charge current is output so that the secondary battery has a predetermined voltage, wherein the charge controlling circuit stops applying a charge current for a predetermined time T1 in beginning of charging of the secondary battery, wherein, when the voltage comparison circuit detects that the voltage of the secondary battery becomes less than a predetermined voltage V1 within the predetermined time T1, the charge controlling circuit judges that the secondary battery is abnormally connected and performs an abnormality correction treatment, and wherein, when the charge current detection circuit detects that the charge current applied to the secondary battery becomes less than a predetermined current i2, and further detects that the charge current becomes less than a predetermined current i1 less than the current i2 within a predetermined time T4, the charge controlling circuit judges that the secondary battery is abnormally connected and performs an abnormality correction treatment.

7. An integrated circuit for charging a secondary battery via a charging transistor, comprising:

a charge current detection circuit which detects a charge current output from the charging transistor, and generates and outputs a signal including the charge current information;

a voltage comparison circuit which compares a voltage of the secondary battery with one or more predetermined voltages, and generates and outputs a signal including the voltage comparison information; and a charge controlling circuit which controls the charging transistor according to information on the voltage of the secondary battery and the signals output from the charge current detection circuit and the voltage comparison circuit such that the charging transistor performs constant current charging in which a predetermined current is output or constant voltage charging in which a charge current is output so that the secondary battery has a predetermined voltage, wherein the charge controlling circuit stops applying a charge current for a predetermined time T1 in beginning of charging of the secondary battery, wherein, when the voltage comparison circuit detects that the voltage of the secondary battery becomes less than a predetermined voltage V1 within the predetermined time T1, the charge controlling circuit judges that the secondary battery is abnormally connected and performs an abnormality correction treatment, and wherein the voltage comparison circuit includes a comparator which compares the voltage of the secondary battery with the voltage V1, and generates and outputs a signal S1 including the comparison information to the charge controlling circuit.

8. An integrated circuit for charging a secondary battery via a charging transistor, comprising:

a charge current detection circuit which detects a charge current output from the charging transistor, and generates and outputs a signal including the charge current information;

a voltage comparison circuit which compares a voltage of the secondary battery with one or more predetermined voltages and generates and outputs a signal including the voltage comparison information;

a charge controlling circuit which controls the charging transistor according to information on the voltage of the secondary battery and the signals output from the charge current detection circuit and the voltage comparison circuit such that the charging transistor performs constant current charging in which a predetermined current is output or constant voltage charging in which a charge current is output so that the secondary battery has a predetermined voltage;

an input terminal which is connected with the secondary battery and to which the voltage of the secondary battery is input; and a current source which applies a current while being controlled according to the control signals input from the charge controlling circuit, wherein the charge controlling circuit stops applying a charge current for a predetermined time T1 in beginning of charging of the secondary battery, wherein, when the voltage comparison circuit detects that the voltage of the secondary battery becomes less than a predetermined voltage V1 within the predetermined time T1, the charge controlling circuit judges that the secondary battery is abnormally connected and performs an abnormality correction treatment, and wherein the charge controlling circuit controls drive of the current source according to an external control signal for controlling a consumption current of a load to which a power is applied from the secondary battery.

9. The integrated circuit according to claim 8, wherein:

the charge controlling circuit allows the current source to operate when the external signal is a signal to reduce the consumption current is input while the charge current is not supplied to the secondary battery, and when input of the external signal is stopped, the charge controlling circuit stops the operation of the current source.

10. An integrated circuit for charging a secondary battery via a charging transistor, comprising:

a charge current detection circuit which detects a charge current output from the charging transistor, and generates and outputs a signal including the charge current information;

a voltage comparison circuit which compares a voltage of the secondary battery with one or more predetermined voltages, and generates and outputs a signal including the voltage comparison information; and a charge controlling circuit which controls the charging transistor according to information on the voltage of the secondary battery and the signals output from the charge current detection circuit and the voltage comparison circuit such that the charging transistor performs constant current charging in which a predetermined current is output or constant voltage charging in which a charge current is output so that the secondary battery has a predetermined voltage, wherein the charge controlling circuit stops applying a charge current for a predetermined time T1 in beginning of charging of the secondary battery, wherein, when the voltage comparison circuit detects that the voltage of the secondary battery becomes less than a predetermined voltage V1 within the predetermined time T1, the charge controlling circuit judges that the secondary battery is abnormally connected and performs an abnormality correction treatment, and wherein, when the charge controlling circuit judges that the secondary battery is abnormally connected, the charge controlling circuit stops applying a charge current to the secondary battery.

11. A charging device for performing constant current charging or constant voltage charging on a secondary battery comprising:

a DC power source configured to apply a DC power to a charging transistor;

the charging transistor configured to apply a charge current to the secondary battery; and a charge controlling integrated circuit for controlling the charging transistor according to information on the charge current applied to the secondary battery and the voltage of the secondary battery, wherein the charge controlling integrated circuit comprises: an integrated circuit for charging a secondary battery via a charging transistor, comprising:

a charge current detection circuit which detects a charge current output from the charging transistor, and generates and outputs a signal including the charge current information;

a voltage comparison circuit which compares a voltage of the secondary battery with one or more predetermined voltages, and generates and outputs a signal including the voltage comparison information; and a charge controlling circuit which controls the charging transistor according to information on the voltage of the secondary battery and the signals output from the charge current detection circuit and the voltage comparison circuit such that the charging transistor performs constant current charging in which a predetermined current is output or constant voltage charging in which a charge current is output so that the secondary battery has a predetermined voltage, wherein the charge controlling circuit stops applying a charge current for a predetermined time T1 in beginning of charging of the secondary battery, wherein, when the voltage comparison circuit detects that the voltage of the secondary battery becomes less than a predetermined voltage V1 within the predetermined time T1, the charge controlling circuit judges that the secondary battery is abnormally connected and performs an abnormality correction treatment, and wherein, when the charge controlling circuit judges that the secondary battery is abnormally connected, the charge controlling circuit stops applying a charge current to the secondary battery.

* * * * *